United States Patent [19]
Cunha

[11] 3,797,863
[45] Mar. 19, 1974

[54] LIGHTWEIGHT CONVERTER DOLLY

[75] Inventor: Joseph J. Cunha, Castro Valley, Calif.

[73] Assignee: Cunha Products, Inc., Haywood, Calif.

[22] Filed: Aug. 11, 1972

[21] Appl. No.: 280,047

[52] U.S. Cl....... 280/476 R, 280/415 B, 280/124 F, 280/415 A, 280/475
[51] Int. Cl.......................... B62d 53/00, B60d 1/14
[58] Field of Search.... 280/475, 415 B, 418, 405 A, 280/407, 476, 504, 495, 515

[56] References Cited
UNITED STATES PATENTS

| | | | |
|---|---|---|---|
| 1,453,886 | 5/1923 | Noble | 280/411 R |
| 2,088,991 | 8/1937 | Berchtold | 280/457 |
| 2,444,876 | 7/1948 | Kuhl | 280/515 X |
| 3,312,479 | 4/1967 | Cunha | 280/415 B X |
| 3,347,563 | 10/1967 | Harbers | 280/415 B X |
| 3,479,055 | 11/1969 | Cunha et al. | 280/415 B X |
| 3,486,768 | 12/1969 | Masser | 280/476 R |

Primary Examiner—Leo Friaglia
Attorney, Agent, or Firm—Naylor, Neal & Uilkena

[57] ABSTRACT

A lightweight converter dolly having uni-body construction of generally triangular profile which serves as both the dolly frame and tongue. An axle is drawn and positioned by trailing arms extending rearwardly from the lower portion of the frame and resilient elastic bodies disposed between the axle and an upper overhanging portion of the frame suspend the frame on the axle. A fifth wheel is mounted on the upper rear portion of the frame for supporting the forward end of a semi-trailer thereon. A hitch is provided at the forward end of the frame by a U-bolt projecting forwardly therefrom. Stand members extend downwardly from the forward portion of the frame for suspension thereof when the dolly is not in use.

6 Claims, 10 Drawing Figures

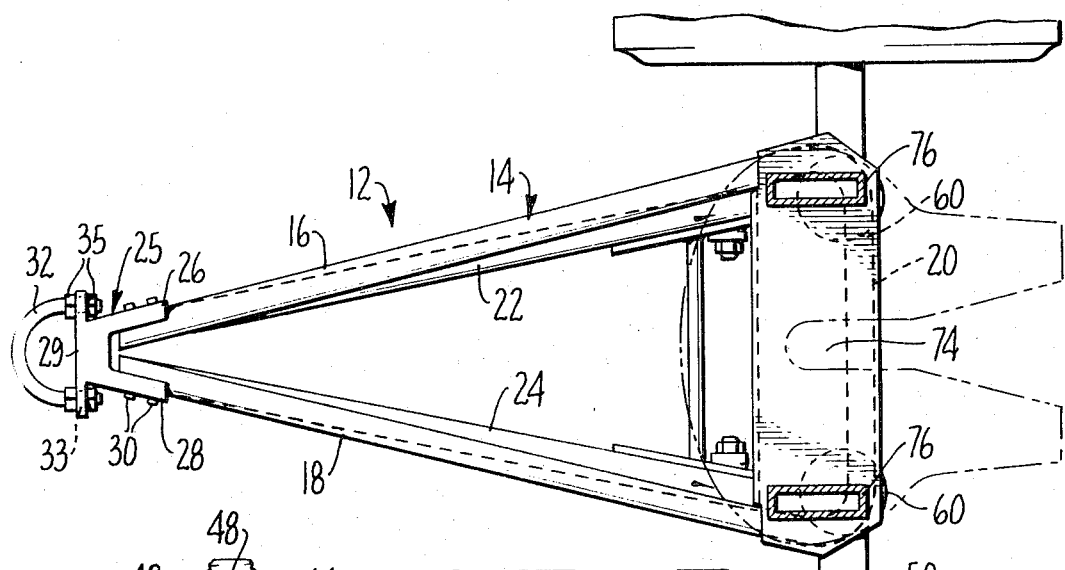
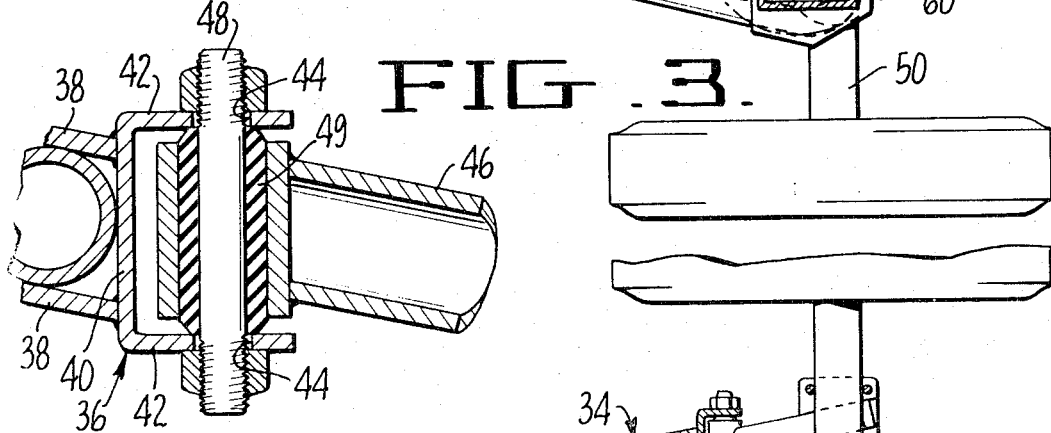
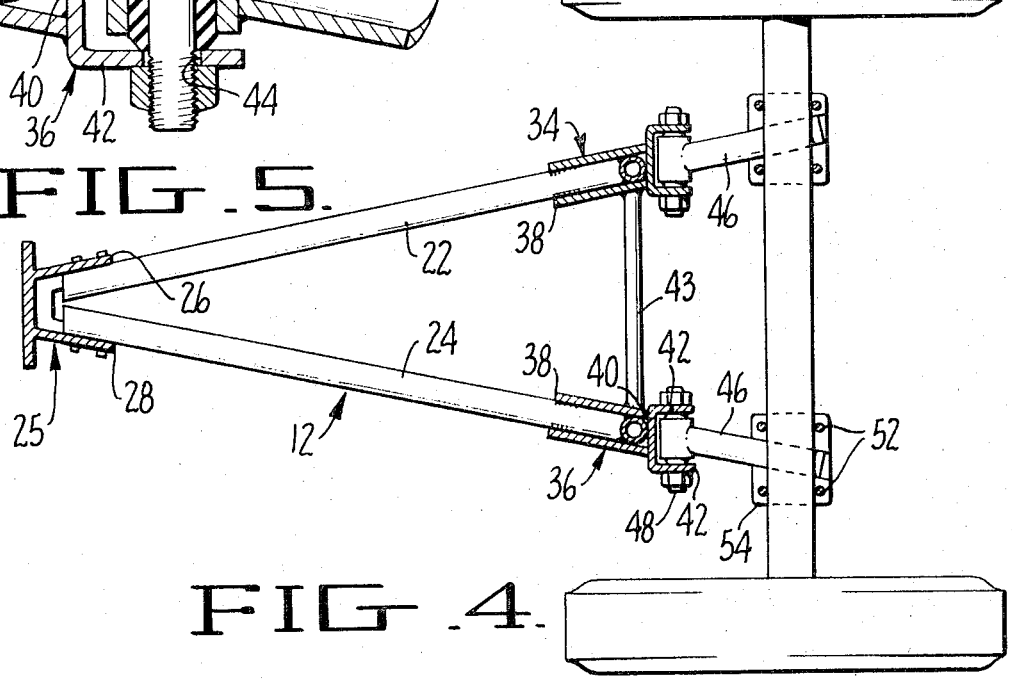
FIG. 3.
FIG. 5.
FIG. 4.

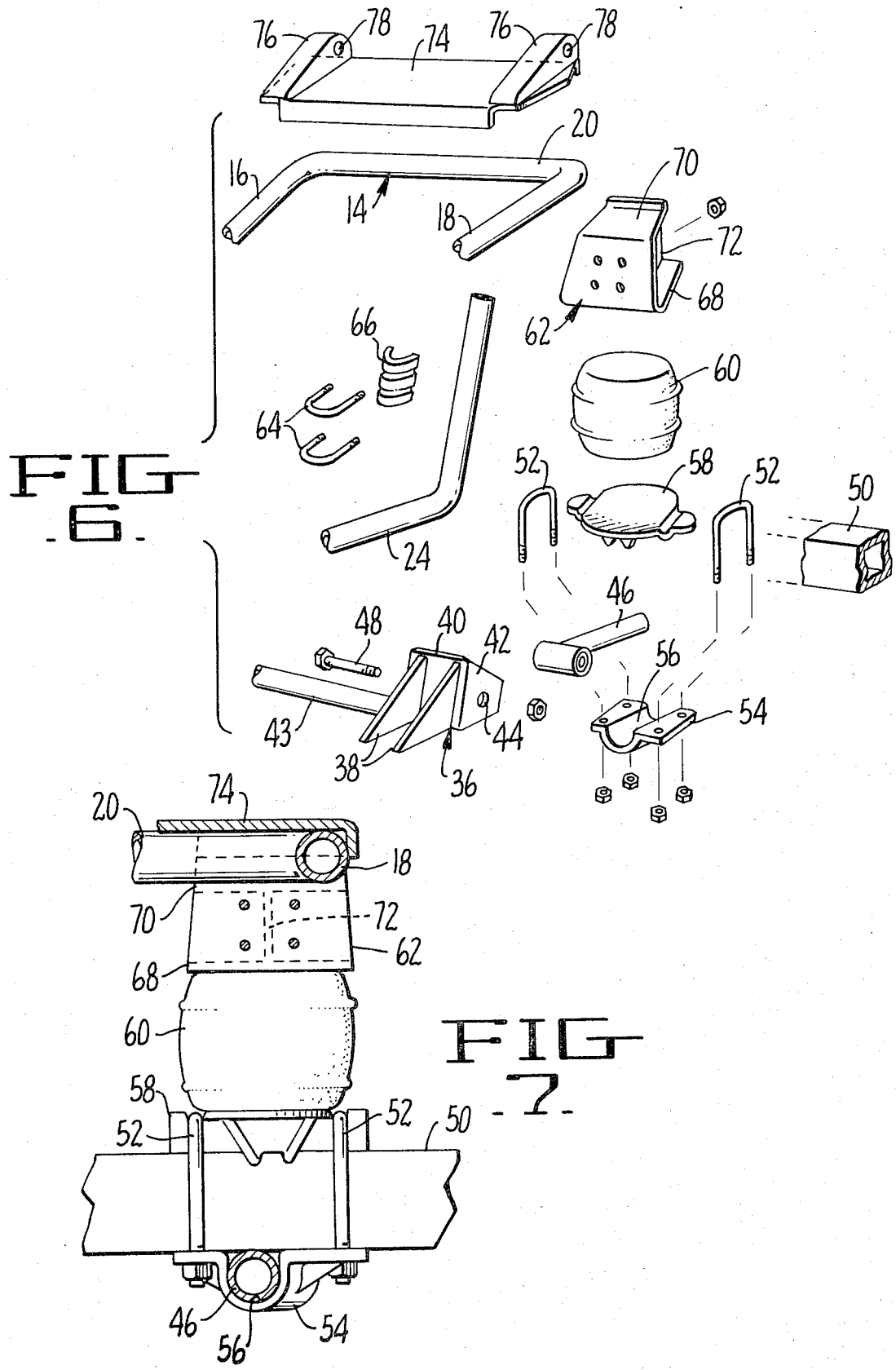

LIGHTWEIGHT CONVERTER DOLLY

BACKGROUND OF THE INVENTION

This invention relates to the field of dollies for converting semi-trailers to full trailers. Such dollies are well known in the art. However, the prior art constructions of such dollies have included heavy frame members and tongues. Such constructions result in a dolly having considerable weight and complexity of design. Prior designs have also included trailing arms pivotally mounted on brackets which depend from the frame, which brackets must be heavy and braced to withstand the bending moments produced therein, and in the frame.

SUMMARY OF THE INVENTION

It is an object of the present invention to provide a trailer dolly that is of simple, lightweight construction and inexpensive to manufacture and maintain.

Another object of this invention is provide a dolly with a tongue that is adjustable as to its length.

In the principal embodiment, the trailer dolly of the present invention comprises a unitary tubular frame of a generally tetrahedronal configuration and triangular profile. The forward convergent end of the frame serves as a tongue and has a U-bolt extending forwardly therefrom which serves as a mating hitch member for a pintle hook. The length of the U-bolt may be varied to vary the effective length of the tongue.

The upper portion of the rearward, divergent end of the frame overhangs the lower portion thereof, and has a fifth wheel mounted thereon for coupling to the forward end of a semi-trailer to effect the support thereof. The frame is mounted on an axle by means of resilient elastic members for resilient suspension of the trailer on the axle. Ideally, the resilient elastic members take the form of solid elastomeric balls, such as the "LASTOSPHERE" marketed by Lord Manufacturing Company of Erie, Pennsylvania. While more conventional resilient suspension means, such as air bags, might be used, this means has the advantage that it is extremely simple and may be used without shock absorbers. Trailing arms extend rearwardly from the lower rearward end of the frame to position and draw the axle. Elongated angled members extend from the forward end of the frame for support thereof when the dolly is not in use.

An alternative embodiment of the present invention employs divergent, triangular vertical gussets, instead of tubular members, to form the dolly frame.

BRIEF DESCRIPTION OF THE DRAWINGS

FIG. 3 is a top sectional view of the dolly shown in FIG. 2 taken along a plane indicated by the arrows 3—3.

FIG. 4 is a sectional view of the dolly shown in FIG. 2 taken along the plane indicated by the arrows 4—4.

FIG. 5 is a sectional view of the trailing arm connection of the dolly shown in FIG. 2 taken along the plane indicated by the arrows 5—5.

FIG. 6 is an exploded perspective view of a portion of the rear end of the dolly of the present invention.

FIG. 7 is a sectional view of the suspension system of the dolly.

DESCRIPTION OF THE PREFERRED EMBODIMENTS

Figure 1:
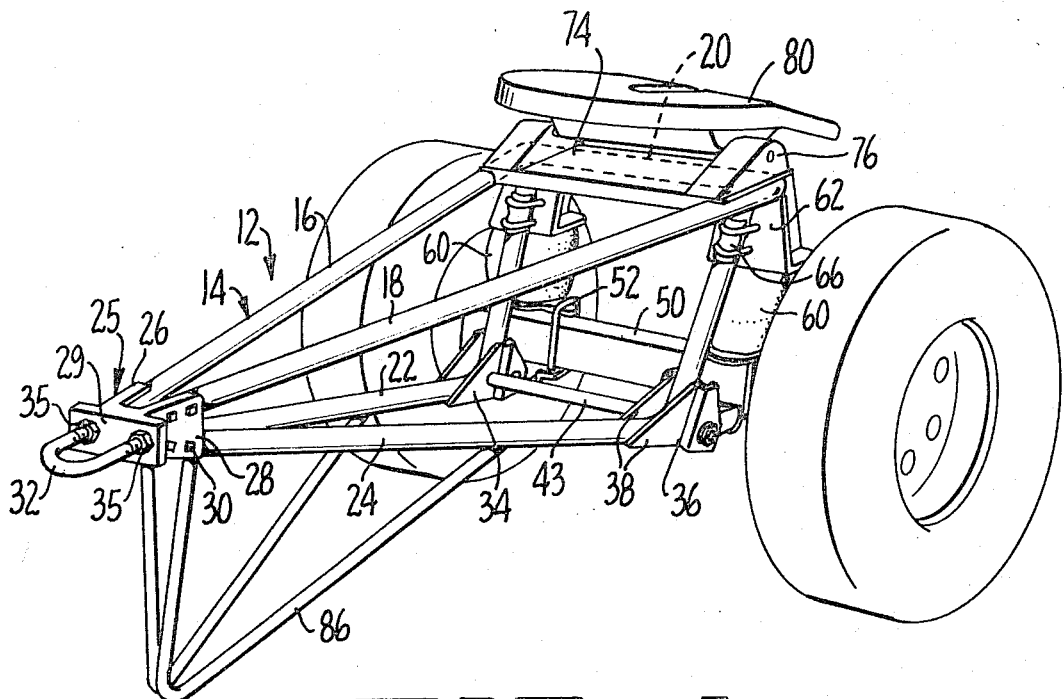
FIG. 1 is a perspective view of the principal embodiment of the dolly of the present invention.
Figure 2:
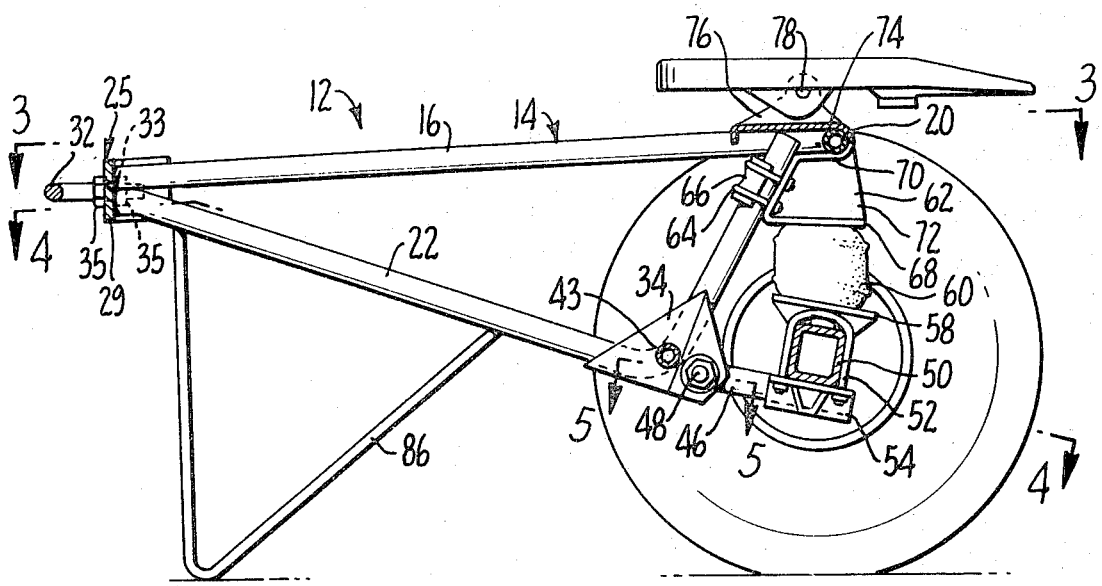
FIG. 2 is a side elevational view of the dolly shown in FIG. 1.

Referring to FIG. 1, the trailer dolly of the present invention includes a tetrahedronal frame shown generally at 12 comprising a triangular tubular member 14 which includes rearwardly diverging side portions 16 and 18 and a transverse rear portion 20. Depending below side portions 16 and 18 are angled members 22 and 24 which extend from the forward ends of the side members downwardly and rearwardly to a point below the rearward end of the side members and then upwardly to intersect the side members. The front ends of the angled members and the side members are all secured together by a fitting 25. The fitting comprises side plates 26 and 28 and a transverse hitch plate 29. As illustrated, bolts 30 secure the fitting to the members. If preferred, however, the fitting 25 may be welded in place. A U-bolt 32 extends through transversely spaced apertures 33 formed in the plate 29 and is releasably and adjustably attached to the plate by nuts 35. The legs of the U-bolt 32 are formed with screw threads and the nuts 35 are received on said threads to either side of the apertures whereby the distance between the plate 29 and the bight portion of the U-bolt may be selectively adjusted.

Gusset plate assemblies 34 and 36 are attached to angled members 22 and 24 and each include spaced, parallel, forwardly extending plates 38 disposed on each side of angled members 22 and 24 and welded thereto. As best viewed in FIGS. 4 and 5, the gusset plate assemblies also include a transverse plate 40 welded to the plates 38, and having spaced parallel rearwardly extending plates 42 attached thereto. A brace bar 43 is fixed to and extends between the gusset plate assemblies.

Aligned bores 44 extend through the plates 42 and tubular trailing arms 46 are pivotally mounted between the plates 42 by means of rubber bushed bolts 48 extending through the bores to provide a torsion joint. The rubber bushings are designated by numeral 49 (FIG. 5). The rearward ends of trailing arms 46 are clamped to an axle 50 by means of U-bolts 52 and pressure plates 54 and, with the axle, define a suspension assembly pivotally attached to the lower rearward end of the frame. The pressure plates have arcuate depressions 56 provided therein for receiving the tubular trailing arms. Also mounted on the axle 50 by means of the U-bolts 52 are suspension brackets 58 mounting resilient elastic bodies 60, which suspend the rearward end of frame 12 by means of upper suspension brackets 62. The elastic bodies 60 are preferably of the unitary elestomeric type, such as the Lord "LASTOSPHERE." Brackets 62 are mounted on the upper ends of angled members 22 and 24 by means of U-bolts 64 and collars 66 (See FIG. 6). Brackets 62 are generally U-shaped in vertical cross-section and include a lower surface 68 which engages the top of the bodies 60, and an upper surface 70 which engages the rear corners of triangular tubular member 14. A web 72 extends between the upper and lower surfaces of bracket 62 for vertical rigidity thereof.

Welded to the top rear portion of triangular tubular member 14 is a fifth wheel mounting plate 74 having upstanding shoulders 76 on each side thereof provided with bores 78 for pivotally mounting a fifth wheel 80 thereon.

A tongue stand is provided by acutely angled support members 84 and 86 attached to and depending from angled members 22 and 24, respectively, for support of the forward portion of the dolly frame 12 when not in use.

Figure 8:
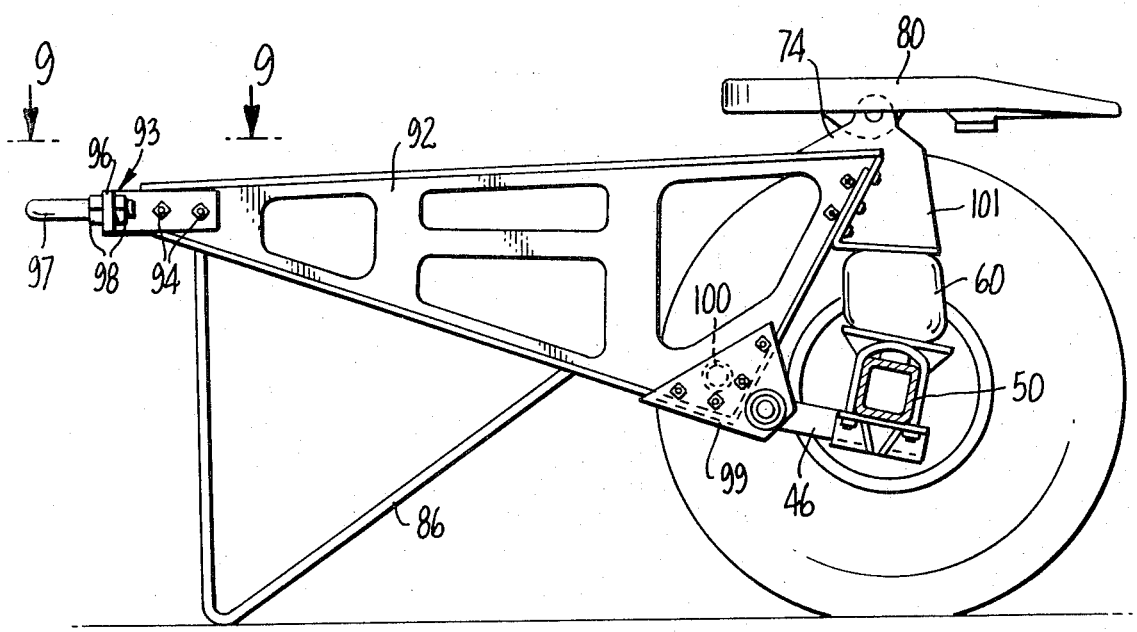
FIG. 8 is a side elevational view of an alternative embodiment of the dolly of the present invention.
Figure 9:
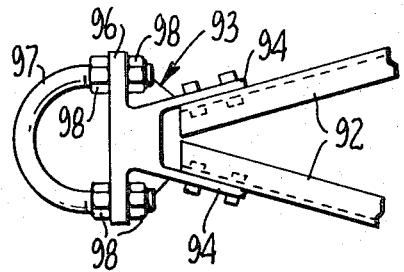
FIG. 9 is a top view of the front end of the dolly shown in FIG. 8 taken along the plane indicated by the arrows 9—9.

An alternative embodiment of the present invention is shown in FIG. 8 wherein the dolly frame comprises two vertical, rearwardly diverging gusset members 92 having their convergent forward ends connected together by a fitting 93. The fitting 93 is similar to the fitting 25, with the exception that it is designed to accommodate the relatively flat sides of the gusset members 92, and comprises side plates 94 and a transverse hitch plate 96. A U-bolt 97, similar to the U-bolt 32, is releasably and adjustably attached to the plate 96 by nuts 98. Gusset members 92 are connected together at their divergent upper ends by wheel mounting plate 74. A gusset plate assembly 99 is bolted to the lower rearward corner of each gusset member 92 for pivotal mounting of trailing arms 46 thereon. A brace bar 100, similar to the bar 43, is fixed to and extends between the assemblies 99. Upper suspension brackets 101, similar to the brackets 62, are bolted to the upper rearward corners of gusset members 92 for suspension of the gussets on axle 50 by means of resilient elastic bodies 60. The elements of the trailing arm suspension assembly correspond to those illustrated in FIG. 6.

Figure 10:
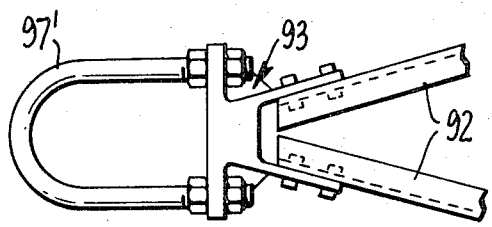
FIG. 10 is a top view similar to FIG. 9, showing an elongated U-bolt used in place of the short U-bolt illustrated in FIG. 9.

FIG. 10 shows how an elongated U-bolt 97' may be attached to the hitch plate 96 to effectively increase the length of the dolly tongue. It will be appreciated by those skilled in the art that this simple hitch construction provides means whereby the length of the drawbar tongue may be adjusted by simply varying the length of the U-bolt. The drawbar eye provided by the U-bolt may also be readily renewed by simply replacing the U-bolt. Thus, the eye is unique in its simplicity and utility, and is exceedingly inexpensive to manufacture and assemble.

It will also be appreciated by those skilled in the art that the entire dolly construction as heretofore described is of unusually simple design. Adequate suspension is ideally effected through the employment of unitary elastic bodies, such as the Lord "LASTOSPHERE." The trailing arms are mounted to trail directly behind the dolly frame, avoiding the use of depending hangers and the resultant bending moments in the frame.

While preferred embodiments of the present invention have been illustrated and described, it should be understood that the invention is not intended to be limited to these embodiments, but rather is defined by the accompanying claims.

I claim:

1. A frame for a semi-trailer converter dolly, said frame comprising:
   a. side members of generally elongated triangular profile, said side members, as viewed elevationally, converging forwardly to define a draft tongue and diverging rearwardly to define vertically spaced attachment points for a trailing arm suspension system;
   b. means securing the side members together so that, as viewed in plan, the forward ends of said members converge and the rearward ends of said members diverge whereby the rearward ends of the respective members are laterally spaced relative to one another and wherein:
      1. as viewed in plan, the top of said frame comprises a first tubular member of generally triangular plan configuration with a base portion defining the rearward end thereof and converging sides defining the forward end thereof;
      2. as viewed in elevation each side member of said frame comprises an upper element defined by one of the converging sides of the first tubular and a lower element defined by a second tubular member, said second tubular member being of angular elevational configuration and having end portions disposed proximate the first tubular member and an apex spaced below the first tubular member.

2. A semi-trailer dolly, comprising:
   a. a frame comprising:
      1. side members of generally elongated triangular profile, said side members, as viewed elevationally, converging forwardly to define a draft tongue and diverging rearwardly to define upper and lower attachment points vertically spaced from one another, said side members having rearward ends which are inclined so as to position the upper attachment points rearwardly of the lower attachment points; and,
      2. means securing the side members together so that, as viewed in plan, the forward ends of said members converge and the rearward ends of said members diverge whereby the rearward ends of the respective members are laterally spaced relative to one another;
   b. a suspension assembly comprising a wheel supported axle having a pair of laterally spaced trailing arms secured thereto and extending forwardly therefrom to pivotal attachment, respectively, with the lower attachment points;
   c. suspension cushion means interposed between said suspension assembly and the upper attachment points;
   d. semi-trailer coupling and supporting means mounted on a rearward portion of the frame; and,
   e. draft coupling means mounted on a forward portion of the tongue defined by side members.

3. A dolly according to claim 2 wherein the suspension cushion means comprises a pair of elastomeric balls, one of said balls being attached between each of the upper attachment points and the suspension assembly.

4. A dolly according to claim 2 wherein the draft coupling means comprises:
   a. a fitting fixedly secured to the forward distal ends of the side members, said fitting defining a pair of transversely spaced apertures;
   b. a U-bolt having legs extending into said apertures and a bight portion spaced forwardly from said fitting; and, c. means releasably securing the legs of the U-bolt in the apertures of the fitting.

5. A dolly according to claim 4 wherein the means releasably securing the legs of the U-bolt in the apertures of the fitting comprises screw thread sections formed on each of the legs and nuts threadably received on said sections to either side of the apertures.

6. A dolly according to claim 2 wherein the means securing the side members together comprises, at least in part, a plate attached between the side members and having spaced upstanding shoulders thereon and the semi-trailer coupling and supporting means comprises a fifth wheel pivotally supported between said shoulders.

* * * * *